US008209514B2

(12) United States Patent
Kisel et al.

(10) Patent No.: US 8,209,514 B2
(45) Date of Patent: Jun. 26, 2012

(54) MEDIA PROCESSING SYSTEM HAVING RESOURCE PARTITIONING

(75) Inventors: Michael Kisel, Stittsville (CA); Tim Jenkins, Kilburn (CA); Dan Cardamore, Ottawa (CA); Giles Roy, Kanata (CA); Peter van der Veen, Ottawa (CA)

(73) Assignee: QNX Software Systems Limited, Kanata, Ontario (CA)

( * ) Notice: Subject to any disclaimer, the term of this patent is extended or adjusted under 35 U.S.C. 154(b) by 437 days.

(21) Appl. No.: 12/425,905

(22) Filed: Apr. 17, 2009

(65) Prior Publication Data

US 2009/0235044 A1 Sep. 17, 2009

Related U.S. Application Data

(63) Continuation-in-part of application No. 12/025,480, filed on Feb. 4, 2008.

(60) Provisional application No. 61/046,267, filed on Apr. 18, 2008.

(51) Int. Cl.
G06F 13/00 (2006.01)
G06F 13/28 (2006.01)

(52) U.S. Cl. ............... 711/173; 711/E12.002; 718/104; 707/103 R; 707/E17.01; 707/E17.055

(58) Field of Classification Search .............. 711/173, 711/E12.002; 718/104; 707/103 R, E17.01, 707/E17.055
See application file for complete search history.

(56) References Cited

U.S. PATENT DOCUMENTS

| 4,238,746 | A | 12/1980 | McCool et al. |
|---|---|---|---|
| 4,282,405 | A | 8/1981 | Taguchi |
| 4,468,804 | A | 8/1984 | Kates et al. |
| 4,486,900 | A | 12/1984 | Cox et al. |
| 4,531,228 | A | 7/1985 | Noso et al. |
| 4,628,156 | A | 12/1986 | Irvin |
| 4,630,305 | A | 12/1986 | Borth et al. |

(Continued)

FOREIGN PATENT DOCUMENTS

CA 2158847 9/1994

(Continued)

OTHER PUBLICATIONS

Anderson C.M., et al: "Adaptive Enhancement of Finite Bandwidth Signals in White Gaussian Noise," *IEEE Trans. on Acoustics, Speech and Signal Processing*, vol. ASSP-31, No. 1, Feb. 1983, pp. 17-28.

(Continued)

*Primary Examiner* — VanThu Nguyen
(74) *Attorney, Agent, or Firm* — Brinks Hofer Gilson & Lione

(57) ABSTRACT

A system comprises memory, process code, and resource partitioning code, where the code is executable by a processor. The process code may spawn multiple processes that request for access to the memory. The resource partitioning code generates resource partition objects and assigns processes to the resource partition objects. The processes may generate media store objects for storage in the memory. The media store objects may correspond to media storage devices and/or the media files accessed by the media storage devices. Access to the memory for storage of the media store objects of a process is based on parametric rules of the corresponding resource partition object.

20 Claims, 10 Drawing Sheets

U.S. PATENT DOCUMENTS

| | | | |
|---|---|---|---|
| 4,731,846 A | 3/1988 | Secrest et al. |
| 4,791,390 A | 12/1988 | Harris et al. |
| 4,811,404 A | 3/1989 | Vilmur et al. |
| 4,843,562 A | 6/1989 | Kenyon et al. |
| 4,939,685 A | 7/1990 | Feintuch |
| 4,969,192 A | 11/1990 | Chen et al. |
| 5,027,410 A | 6/1991 | Williamson et al. |
| 5,056,150 A | 10/1991 | Yu et al. |
| 5,146,539 A | 9/1992 | Doddington et al. |
| 5,278,780 A | 1/1994 | Eguchi |
| 5,313,555 A | 5/1994 | Kamiya |
| 5,377,276 A | 12/1994 | Terai et al. |
| 5,400,409 A | 3/1995 | Linhard |
| 5,406,622 A | 4/1995 | Silverberg et al. |
| 5,408,581 A | 4/1995 | Suzuki et al. |
| 5,412,735 A | 5/1995 | Engebretson et al. |
| 5,432,859 A | 7/1995 | Yang et al. |
| 5,459,813 A | 10/1995 | Klayman |
| 5,473,702 A | 12/1995 | Yoshida et al. |
| 5,479,517 A | 12/1995 | Linhard |
| 5,494,886 A | 2/1996 | Kehne et al. |
| 5,495,415 A | 2/1996 | Ribbens et al. |
| 5,502,688 A | 3/1996 | Recchione et al. |
| 5,526,466 A | 6/1996 | Takizawa |
| 5,530,768 A | 6/1996 | Yoshizumi |
| 5,568,559 A | 10/1996 | Makino |
| 5,572,262 A | 11/1996 | Ghosh |
| 5,584,295 A | 12/1996 | Muller et al. |
| 5,590,241 A | 12/1996 | Park et al. |
| 5,615,298 A | 3/1997 | Chen |
| 5,617,508 A | 4/1997 | Reaves |
| 5,641,931 A | 6/1997 | Ogai et al. |
| 5,652,832 A | 7/1997 | Kane et al. |
| 5,677,987 A | 10/1997 | Seki et al. |
| 5,680,508 A | 10/1997 | Liu |
| 5,692,104 A | 11/1997 | Chow et al. |
| 5,701,344 A | 12/1997 | Wakui |
| 5,714,997 A | 2/1998 | Anderson |
| 5,737,719 A | 4/1998 | Terry |
| 5,742,694 A | 4/1998 | Eatwell |
| 5,812,844 A | 9/1998 | Jones et al. |
| 5,819,215 A | 10/1998 | Dobson et al. |
| 5,845,243 A | 12/1998 | Smart et al. |
| 5,920,840 A | 7/1999 | Satyamurti et al. |
| 5,920,848 A | 7/1999 | Schutzer et al. |
| 5,933,801 A | 8/1999 | Fink et al. |
| 5,949,886 A | 9/1999 | Nevins et al. |
| 5,949,888 A | 9/1999 | Gupta et al. |
| 5,953,694 A | 9/1999 | Pillekamp |
| 6,011,853 A | 1/2000 | Koski et al. |
| 6,084,907 A | 7/2000 | Nagano et al. |
| 6,111,957 A | 8/2000 | Thomasson |
| 6,144,336 A | 11/2000 | Preston et al. |
| 6,163,608 A | 12/2000 | Romesburg et al. |
| 6,167,375 A | 12/2000 | Miseki et al. |
| 6,173,074 B1 | 1/2001 | Russo |
| 6,175,602 B1 | 1/2001 | Gustafsson et al. |
| 6,192,134 B1 | 2/2001 | White et al. |
| 6,199,035 B1 | 3/2001 | Lakaniemi et al. |
| 6,219,418 B1 | 4/2001 | Eriksson et al. |
| 6,249,275 B1 | 6/2001 | Kodama |
| 6,282,430 B1 | 8/2001 | Young |
| 6,285,979 B1 | 9/2001 | Ginzburg et al. |
| 6,405,168 B1 | 6/2002 | Bayya et al. |
| 6,408,273 B1 | 6/2002 | Quagliaro et al. |
| 6,434,246 B1 | 8/2002 | Kates et al. |
| 6,473,409 B1 | 10/2002 | Malvar |
| 6,493,338 B1 | 12/2002 | Preston et al. |
| 6,507,814 B1 | 1/2003 | Gao |
| 6,587,816 B1 | 7/2003 | Chazan et al. |
| 6,628,781 B1 | 9/2003 | Grundström et al. |
| 6,633,894 B1 | 10/2003 | Cole |
| 6,643,619 B1 | 11/2003 | Linhard et al. |
| 6,687,669 B1 | 2/2004 | Schrögmeier et al. |
| 6,690,681 B1 | 2/2004 | Preston et al. |
| 6,725,190 B1 | 4/2004 | Chazan et al. |
| 6,732,073 B1 | 5/2004 | Kluender et al. |
| 6,771,629 B1 | 8/2004 | Preston et al. |
| 6,782,363 B2 | 8/2004 | Lee et al. |
| 6,804,640 B1 | 10/2004 | Weintraub et al. |
| 6,822,507 B2 | 11/2004 | Buchele |
| 6,836,761 B1 | 12/2004 | Kawashima et al. |
| 6,859,420 B1 | 2/2005 | Coney et al. |
| 6,871,176 B2 | 3/2005 | Choi et al. |
| 6,885,752 B1 | 4/2005 | Chabries et al. |
| 6,891,809 B1 | 5/2005 | Ciccone et al. |
| 6,898,293 B2 | 5/2005 | Kaulberg |
| 6,910,011 B1 | 6/2005 | Zakarauskas |
| 6,937,978 B2 | 8/2005 | Liu |
| 7,020,291 B2 | 3/2006 | Buck et al. |
| 7,117,149 B1 | 10/2006 | Zakarauskas |
| 7,146,012 B1 | 12/2006 | Belt et al. |
| 7,146,316 B2 | 12/2006 | Alves |
| 7,167,516 B1 | 1/2007 | He |
| 7,167,568 B2 | 1/2007 | Malvar et al. |
| 7,206,418 B2 | 4/2007 | Yang et al. |
| 7,222,345 B2 | 5/2007 | Gray et al. |
| 7,231,347 B2 | 6/2007 | Zakarauskas |
| 7,269,188 B2 | 9/2007 | Smith |
| 7,272,566 B2 | 9/2007 | Vinton |
| 7,346,569 B2 | 3/2008 | Oberuc |
| 7,406,522 B2 | 7/2008 | Riddle |
| 7,647,346 B2 * | 1/2010 | Silverman et al. ..... 707/999.107 |
| 7,721,292 B2 | 5/2010 | Frasier et al. |
| 7,783,686 B2 * | 8/2010 | Gates et al. .................. 707/829 |
| 2001/0005822 A1 | 6/2001 | Fujii et al. |
| 2001/0028713 A1 | 10/2001 | Walker |
| 2002/0052736 A1 | 5/2002 | Kim et al. |
| 2002/071573 A1 | 6/2002 | Finn |
| 2002/0176589 A1 | 11/2002 | Buck et al. |
| 2002/0194251 A1 | 12/2002 | Richter et al. |
| 2003/0040908 A1 | 2/2003 | Yang et al. |
| 2003/0093265 A1 | 5/2003 | Xu et al. |
| 2003/0093270 A1 | 5/2003 | Domer |
| 2003/0097257 A1 | 5/2003 | Amada et al. |
| 2003/0101048 A1 | 5/2003 | Liu |
| 2003/0206640 A1 | 11/2003 | Malvar et al. |
| 2003/0216907 A1 | 11/2003 | Thomas |
| 2004/0002856 A1 | 1/2004 | Bhaskar et al. |
| 2004/0024600 A1 | 2/2004 | Hamza et al. |
| 2004/0071284 A1 | 4/2004 | Abutalebi et al. |
| 2004/0078200 A1 | 4/2004 | Alves |
| 2004/0138882 A1 | 7/2004 | Miyazawa |
| 2004/0165736 A1 | 8/2004 | Hetherington et al. |
| 2004/0167777 A1 | 8/2004 | Hetherington et al. |
| 2004/0179610 A1 | 9/2004 | Lu et al. |
| 2005/0075866 A1 | 4/2005 | Widrow |
| 2005/0111683 A1 | 5/2005 | Chabries et al. |
| 2005/0114128 A1 | 5/2005 | Hetherington et al. |
| 2005/0240401 A1 | 10/2005 | Ebenezer |
| 2006/0034447 A1 | 2/2006 | Alves et al. |
| 2006/0056502 A1 | 3/2006 | Callicotte |
| 2006/0074646 A1 | 4/2006 | Alves et al. |
| 2006/0089958 A1 | 4/2006 | Giesbrecht et al. |
| 2006/0089959 A1 | 4/2006 | Nongpiur et al. |
| 2006/0100868 A1 | 5/2006 | Hetherington et al. |
| 2006/0115095 A1 | 6/2006 | Giesbrecht et al. |
| 2006/0116873 A1 | 6/2006 | Hetherington et al. |
| 2006/0178972 A1 | 8/2006 | Jung et al. |
| 2006/0251268 A1 | 11/2006 | Hetherington et al. |
| 2006/0287859 A1 | 12/2006 | Hetherington et al. |
| 2007/0033031 A1 | 2/2007 | Zakarauskas |
| 2007/0136055 A1 | 6/2007 | Hetherington |
| 2007/0162909 A1 | 7/2007 | Bahl et al. |
| 2008/0059971 A1 | 3/2008 | Abbey et al. |

FOREIGN PATENT DOCUMENTS

| | | |
|---|---|---|
| CA | 2157496 | 10/1994 |
| CA | 2158064 | 10/1994 |
| EP | 0 076 687 A1 | 4/1983 |
| EP | 0 275 416 | 7/1988 |
| EP | 0 558 312 A1 | 9/1993 |
| EP | 0 629 996 A2 | 12/1994 |
| EP | 0 629 996 A3 | 12/1994 |
| EP | 0 750 291 A1 | 12/1996 |
| EP | 0 948 237 A2 | 10/1999 |
| EP | 1 450 353 A1 | 8/2004 |

| | | | |
|---|---|---|---|
| EP | 1 450 354 A1 | 8/2004 |
| EP | 1 669 983 A1 | 6/2006 |
| JP | 06269084 A2 | 9/1994 |
| JP | 06319193 A | 11/1994 |
| WO | WO 0041169 A1 | 7/2000 |
| WO | WO 0156255 A1 | 8/2001 |
| WO | WO 0173761 A1 | 10/2001 |
| WO | WO 2006/130668 | 12/2006 |

OTHER PUBLICATIONS

Avendano, C. et al., "Study on the Dereverberation of Speech Based on Temporal Envelope Filtering," Proc. ICSLP '96, Oct. 1996, pp. 889-892.

Berk et al., "Data Analysis with Microsoft Excel," Duxbury Press, 1998, pp. 236-239 and 356-359.

Bilcu, R.C. et al., "A New Variable Length LMS Algorithm: Theoretical Analysis and Implementations," 2002, IEEE, pp. 1031-1034.

Byun K.J., et al: "Noise Whitening-Based Pitch Detection for Speech Highly Corrupted by Colored Noise," *ETRI Journal*, vol. 25, No. 1, Feb. 2003, pp. 49-51.

Campbell D.A., et al: "Dynamic Weight Leakage for LMS Adaptive Linear Predictors," *Tencon '96 Proceedings*, 1996 IEEE Tencon Digital Signal Processing Applications Perth, WA, Australia Nov. 26-29, 1996, NY, NY, USA, IEEE, US, vol. 2, Nov. 26, 1996, pp. 574-579.

Chang J.H., et al: "Pitch Estimation of Speech Signal Based on Adaptive Lattice Notch Filter," *Signal Processing*, Elsevier Science Publishers B.V. Amsterdam, NL, vol. 85, No. 3, Mar. 2005, pp. 637-641.

Fiori, S. et al., "Blind Deconvolution by Modified Bussgang Algorithm," Dept. of Electronics and Automatics—University of Ancona (Italy), ISCAS 1999, 4 pages.

Kang, Hae-Dong; "Voice Enhancement Using a Single Input Adaptive Noise Elimination Technique Having a Recursive Time-Delay Estimator," Kyungbook National University (Korea), Doctoral Thesis, Dec. 31, 1993, pp. 11-26.

Kauppinen, I., "Methods for Detecting Impulsive Noise in Speech and Audio Signals," 2002, IEEE, pp. 967-970.

Koike, S., "Adaptive Threshold Nonlinear Algorithm for Adaptive Filters with Robustness Against Impulse Noise," 1996, IEEE, NEC Corporation, Tokyo 108-01, pp. 1644-1647.

Learned, R.E. et al., A Wavelet Packet Approach to Transient Signal Classification, Applied and Computational Harmonic Analysis, 1995, pp. 265-278.

Nakatani, T., Miyoshi, M., and Kinoshita, K., "Implementation and Effects of Single Channel Dereverberation Based on the Harmonic Structure of Speech," Proc. of IWAENC-2003, Sep. 2003, pp. 91-94.

Nascimento, V.H., "Improving the Initial Convergence of Adaptive Filters: Variable-Length LMS Algorithms," 2002 IEEE, pp. 667-670.

Pornimitkul, P. et al., 2102797 Statistic Digital Signal Processing, Comparison of NLMS and RLS for Acoustic Echo Cancellation (AEC) and White Gaussian Noise (WGN), Department of Electrical Engineering Faculty of Engineering, Chulalongkorn University, 2002, pp. 1-19.

Puder, H. et al., "Improved Noise Reduction for Hands-Free Car Phones Utilizing Information on a Vehicle and Engine Speeds," Signal Theory, Darmstadt University of Technology, 2000, pp. 1851-1854.

Quatieri, T.F. et al., "Noise Reduction Using a Soft-Decision Sine-Wave Vector Quantizer," International Conference on Acoustics, Speech & Signal Processing, 1990, pp. 821-824.

Quelavoine, R. et al., "Transients Recognition in Underwater Acoustic with Multilayer Neural Networks," Engineering Benefits from Neural Networks, Proceedings of the International Conference EANN 1998, Gibraltar, Jun. 10-12, 1998 pp. 330-333.

Rabiner L.R., et al: "A Comparative Performance Study of Several Pitch Detection Algorithms," *IEEE Trans. on Acoustics, Speech and Signal Processing*, vol. ASSP-24, No. 5, Oct. 1976, pp. 399-418.

Sasaoka N, et al: "A New Noise Reduction System Based on ALE and Noise Reconstruction Filter," *Circuits and Systems*, 2005. ISCAS 2005. IEEE International Symposium on KOBE, Japan May 23-26, 2005, Piscataway, NJ USA, IEEE May 23, 2005, pp. 272-275.

Seely, S., "An Introduction to Engineering Systems," Pergamon Press Inc., 1972, pp. 7-10.

Shust, M.R. et al., "Electronic Removal of Outdoor Microphone Wind Noise," obtained from the Internet on Oct. 5, 2006 at: <http://www.acoustics.org/press/136th/mshust.htm>, 6 pages.

Shust, M.R., Abstract of "Active Removal of Wind Noise From Outdoor Microphones Using Local Velocity Measurements," *J. Acoust. Soc. Am.*, vol. 104, No. 3, Pt 2, 1998, 1 page.

Simon, G., "Detection of Harmonic Burst Signals," International Journal Circuit Theory and Applications, Jul. 1985, vol. 13, No. 3, pp. 195-201.

Tam, K. et al., "Highly Oversampled Subband Adaptive Filters for Noise Cancellation on a Low-resource DSP System," Proc. of Int. Conf. on Spoken Language Processing (ICSLP), Sep. 2002, pp. 1-4.

Vaseghi, S. et al., "The Effects of Non-Stationary Signal Characteristics on the Performance of Adaptive Audio Restoration System," 1989, IEEE, pp. 377-380.

Vieira, J., "Automatic Estimation of Reverberation Time," Audio Engineering Society, Convention Paper 6107, 116th Convention, May 8-11, 2004, Berlin, Germany, pp. 1-7.

Wahab A. et al., "Intelligent Dashboard With Speech Enhancement," Information, Communications, and Signal Processing, 1997. ICICS, Proceedings of 1997 International Conference on Singapore, Sep. 9-12, 1997, New York, NY, USA, IEEE, pp. 993-997.

Widrow, B. et al., "Adaptive Noise Cancelling: Principles and Applications," 1975, IEEE, vol. 63, No. 13, New York, pp. 1692-1716.

Zakarauskas, P., "Detection and Localization of Nondeterministic Transients in Time series and Application to Ice-Cracking Sound," Digital Signal Processing, 1993, vol. 3, No. 1, pp. 36-45.

\* cited by examiner

MEDIA PROCESSING SYSTEM HAVING RESOURCE PARTITIONING

PRIORITY CLAIM

This application claims the benefit of priority from U.S. Provisional Application Ser. No. 61/046,267, filed Apr. 18, 2008, and is a continuation-in-part U.S. patent application Ser. No. 12/025,480, filed Feb. 4, 2008, both of which are incorporated by reference.

BACKGROUND OF THE INVENTION

1. Technical Field

This invention relates to the management of resources in a media processing system.

2. Related Art

Computers, embedded controllers, and other processing systems may include a number of finite resources that are allocatable to processes executed by the system. Such finite resources may include memory, communication bandwidth resources, interrupt handling resources, and other resources. The management of such allocatable resources may have an impact on the operation and/or efficiency of the processing system.

System memory may be one such finite allocatable resource. Processes may reserve fixed-sized portions of memory for use by the process. The fixed-sized memory portions are used by the process but may include portions that are never used by the process. This may result in a lack of free memory that blocks or delays other processes. A process may also reserve access to all or a portion of an I/O device and thereby block access of the I/O device to other processes.

SUMMARY

A system comprises memory, process code, and resource partitioning code, where the code is executable by a processor. The process code may spawn multiple processes that request for access to the memory. The resource partitioning code generates resource partition objects and assigns processes to the resource partition objects. The processes may generate media store objects for storage in the memory. The media store objects may correspond to media storage devices and/or the media files accessed by the media storage devices. Access to the memory for storage of the media store objects of a process is based on parametric rules of the corresponding resource partition object.

Other systems, methods, features and advantages of the system will be, or will become, apparent to one with skill in the art upon examination of the following figures and detailed description. It is intended that all such additional systems, methods, features and advantages be included within this description, be within the scope of the invention, and be protected by the following claims.

BRIEF DESCRIPTION OF THE DRAWINGS

The invention can be better understood with reference to the following drawings and description. The components in the figures are not necessarily to scale, emphasis instead being placed upon illustrating the principles of the invention. Moreover, in the figures, like referenced numerals designate corresponding parts throughout the different views.

DETAILED DESCRIPTION OF THE PREFERRED EMBODIMENTS

Figure 1:
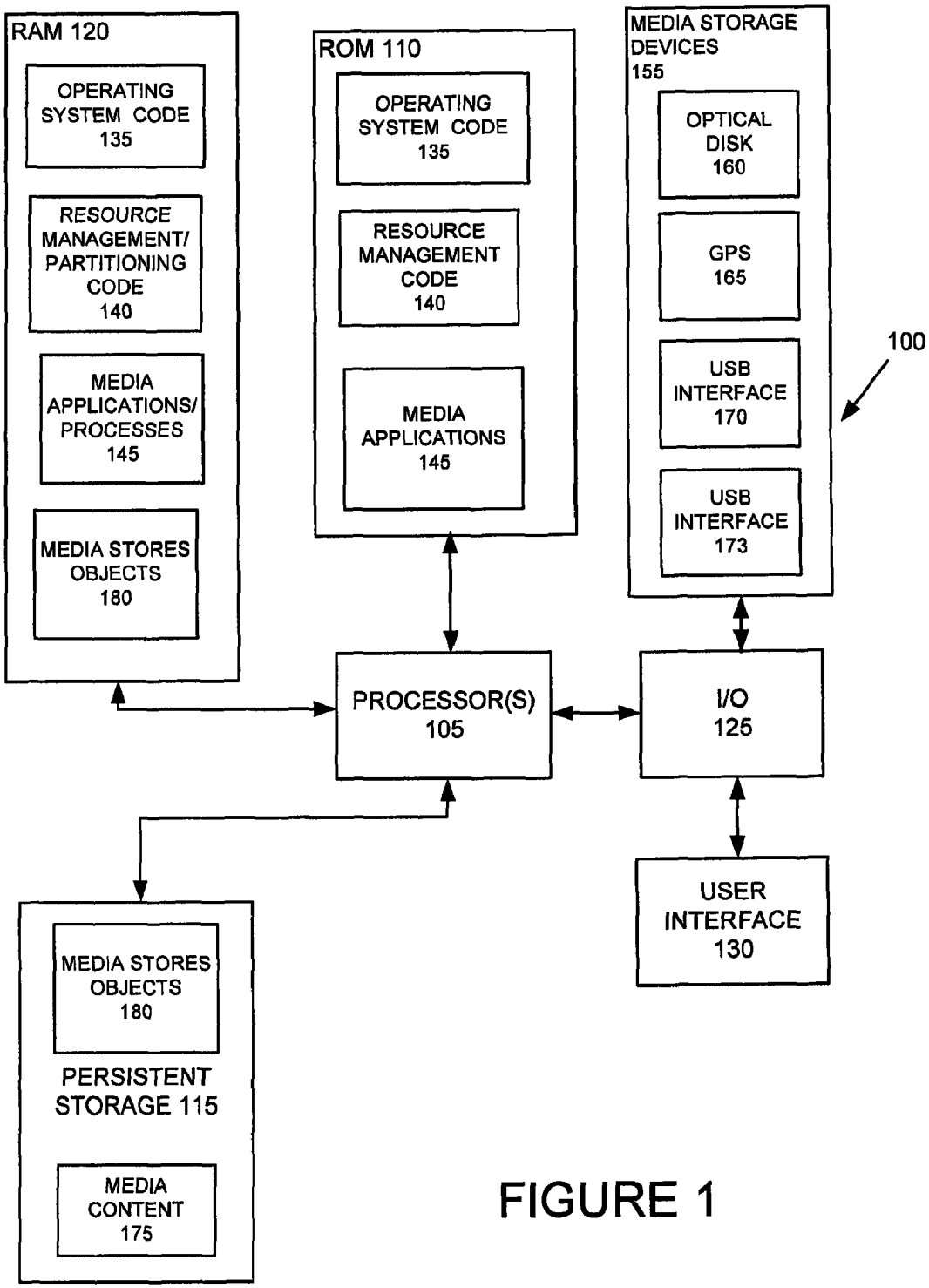
FIG. 1 is a processing system having resource partitioning of media objects.

FIG. 1 is a processing system 100 having resource management of media store objects, where the media store objects are stored in memory as data representing physical storage devices and/or media files stored on such devices. System 100 may include one or more processors 105, memory such as read only memory (ROM) 110 and random access memory 120, persistent storage 115 and an I/O (input/output) interface 125. System 100 also may include a user interface 130 that may support the playing and presentation of media and multimedia content based on, for example, user interaction through the user interface 130. The user interface 130 may include one or more display screens, audio amplifiers and speakers, hard-wired or wireless headsets or earphones, and similar audio and/or visual devices.

Processor 105 may access media storage devices 155 of system 100. In FIG. 1, media storage devices 155 may be accessed through I/O 125, but other additional and/or alternative access architectures may also be used. The media storage devices 155 in system 100 may include an optical disk drive 160, a GPS device 165, and one or more universal serial bus (USB) devices 170 and 173. Optical disk drive 160 may be adapted to play and/or provide information relating to media, such as songs, video, or similar media content, from a CD and/or DVD. GPS device 165 may be adapted to provide information and/or media relating to geographical locations (e.g., maps, locations of interest, and other media). USB devices 170 and 173 may be adapted to receive removable non-volatile storage having media content.

Persistent storage 115 may comprise a hard disk drive, floppy disk drive, optical drive or other non-volatile memory and any corresponding ports and/or connectors. It may be a non-rotating media device, such as non-volatile memory implemented in an integrated circuit format (i.e. FLASH memory, etc.). The persistent storage 115 need not be limited to a single memory structure. Rather, the persistent storage 115 may include a number of separate storage devices of the same type (e.g., all FLASH memory) and/or separate storage devices of different types (e.g., one or more FLASH memory units and one or more hard disk drives).

Persistent storage 115 may also be used as a media storage device. In FIG. 1, persistent storage 115 may include media content 175 such as media content ripped from CDs and/or DVDs inserted into the optical disk drive 160, media content that is downloaded using wired and/or wireless communication with a local area network, wide area network, and/or the Internet. Media content 175 may also include media and/or media data from or for use by GPS 165 as well as media and/or media data copied from non-volatile memory inserted into the USB devices 170 and 173.

Read only memory (ROM) 110 may retain operating system code 135, resource management/partitioning code 140, and media application/processing code 145. The code 135, 140, and 145, may be transferred to random access memory 120 where it may be executed by the processor 105. The transfer of the code may be take place during a boot operation of the system 100 and/or in response to a request from a process for access to the code and/or operations performed through execution of the code.

The operating system code 135 may control the interaction between high-level application code (e.g., media applications 145 and corresponding media processes) and hardware components, including memory devices 110 and 120, persistent storage 115, interface devices 125 and 130, and media storage devices 155. Resource management/partitioning code 140 may be part of the operating system code 135, code that is exterior to the operating system code 140, and/or a combination of both. The resource management/partitioning code 140 may be stored in a medium local to and/or remote of operating system code 135. In some systems, the resource management/partitioning code 140 may be stored in persistent storage 115, or in some other storage medium local to and/or remote of system 100. When the processing system 100 is linked with other computers and/or storage devices through I/O interface 125, the resource management/partitioning code 140 may be stored remotely and downloaded to processing system 100 as needed. FIG. 1 illustrates initial storage of the resource management/partitioning code 140 in read only memory 110 and subsequent transfer to random access memory 120 for execution by processor 105.

System 100 may include one or more media store objects 180. The media store objects 180 are stored as data in system memory and are associated with each of the storage devices 155. A single media store objects may be associated with a respective media storage device 155. Additionally, or alternatively, multiple media store objects may be associated with the media storage devices. Each media store object may represent a storage device and/or media files accessed by the storage device.

The media store objects 180 may be organized as one or more databases, where the media store objects 180 are instantiated by one or more of the processes and/or threads (collectively "processes") of the media applications 145. Each media store objects 180 may include metadata identifying various characteristics of image files, audio files (e.g., songs, audio books, and other audio file types), video files, and/or other multimedia files found on a respective storage device 155. In the case of an image file, the metadata information may include a title, textual description, copyright information, camera make and model used to generate the image, the date and time at which the image was generated, and/or other metadata identifying characteristics of the image file. Metadata for such image files may include information corresponding to generally accepted standards, such as the EXIF standard. In the case of an audio file, such as a song file, the information may include song name, album name, track number, album cover graphics, lyrics, artist, label, release year and musical genre. In the case of a video file, the information may include descriptive, administrative and structural information, including title, director, producer, digital rights management data, data format and encoding. The metadata for each media file type may include information corresponding to generally accepted standards currently used for each media file type and may also be extended to proprietary and future metadata information for media files.

Media store objects 180 may be stored on one or more of the memory devices of system 100. System 100 shows the media store objects 180 on random access memory 120 and persistent storage 115. Additionally, or in the alternative, the media store objects 180 may be stored on a single memory type in system 100 and/or memory storage remote to system 100.

The processes of the media applications 145 may generate media store objects 180 when the media storage device is added to system 100 and/or when media files become available to one or more of the storage devices 155. The media store objects 180 may be removed when the corresponding media files are no longer accessible to the corresponding storage device and/or when the media storage device is removed from the system 100. The processes all of the media applications 145 may not relinquish the physical memory used by the media store objects 180 for use by other processes of the media application 145. This may block use of the memory resource by other processes. Alternatively, a media process of an application 145 associated with one or more of the storage devices 155 may completely relinquish the physical memory used by the corresponding media store objects. This may increase the amount of time it takes before the media files on a storage device 155 are accessible to a media process.

The resource management/partitioning code 140 may be executed by the processor 105 to organize and control access to the various allocatable computer resources used by the processes of the media applications 145. The computer resource may include memory that is internal and/or external to the system, memory that is suitable for direct memory access (DMA), and/or memory that is incompatible with DMA control. The computer resource may additionally, or in the alternative, include, other resources allocatable based on media content accessible to the each of the media storage devices 155 and/or associated with the operation of one or more of the storage devices 155, interfaces 125 and 130, USB devices 170 and 173, or other resource used by a media process. For purposes of the following description, the computer resource may be memory resources, although the description may be applicable to other media related resources.

Figure 2:
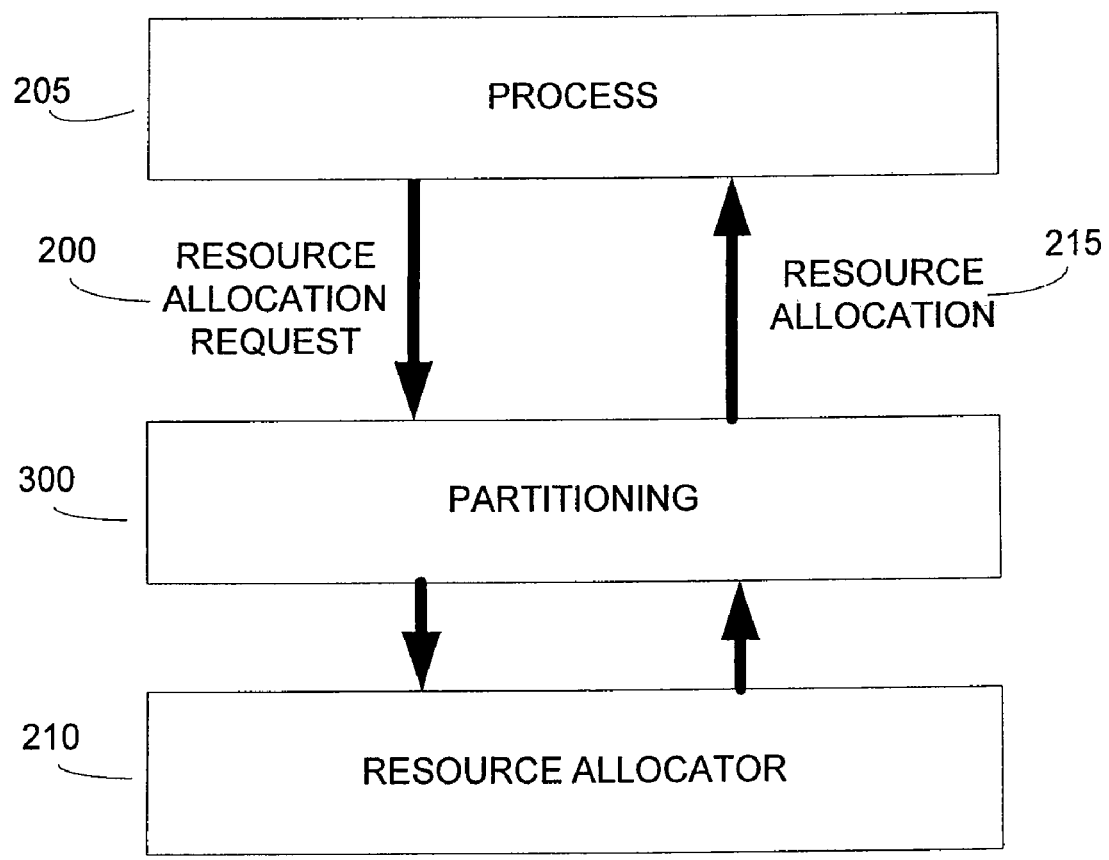
FIG. 2 shows communication between components of a media processing system having partitioned resource allocation management.

FIG. 2 shows communication between components of a processing system having partitioned resource allocation management. The components shown in FIG. 2 may include a partitioning module 300 in communication with process 205 as well as with a resource allocator 210. The resource allocator 210 may be part of the resource management/partitioning code 140 and may coordinate access to resources, such as memory storage, requested at 200 by process 205. The operations and communications used by resource allocator 210 may vary depending on the nature of the resource being allocated. The resource allocator 210 may respond to the requests by reserving the requested resource for use by the process 205. It may also return corresponding confirmations, mappings, and/or resource allocation data 215 back to the requesting process 205.

The partitioning module 300 also may be part of the resource management code 143. The partitioning module 300 may receive one or more resource requests 200 issued by the process 205 and manipulate one or more of the resource requests 200 to provide new and/or modified requests to the resource allocator 210. The partitioning module 300 may also validate and/or deny requests to enforce parametric rules for a partition corresponding to the requested resource. The partitioning module 300 may also arbitrate communications between the resource allocator 210 and the process 205. For example, the partitioning module 300 may intercept and/or manipulate and/or validate the communication of confirmations, mappings and/or resource allocation data 215 returned to the process 205.

The partitioning module 300 may define and manage new partitions and classes in response to requests by the processes for media store resources. For example, the partitioning module 300 may set minimum and maximum values for resource constraints and/or parameters for the partitions as well as other partition properties.

When a process instantiates an object associated with one or more of the media storage devices 155, the class of resource that the object uses may be different than the class of resources for another object instantiated by the same process. Resource classes may be supported by the partitioning module 300 so that different classes of resources (e.g., resources with different attributes) may be independently partitioned. If a process uses a particular class of resource, that process may be associated with a partition object of that class, independent of the resource classes used by other process.

The components of FIG. 2 may in stand sheet objects of classes, where the classes may distinguish between levels of importance and/or costs of resources. Memory compatible with a DMA controller may be distinguished from memory that may not be compatible with a DMA controller. DMA compatible memory may be used for general purposes. However, all of the DMA compatible memory need not be allocated for general use. If the memory is not differentiated, DMA compatible memory may not be available to satisfy a request from a process that solely requires DMA compatible memory. By partitioning objects of different resource classes separately using different parameters, and associating a single process with more than one partition object, resource requirements of processes for both DMA compatible and non-DMA memory may be met. A similar approach may be taken with respect to other system resources.

When the partitioning module 300 generates objects for partitioning resources, each object of a resource class may be partitioned independently. A resource partition object may represent a single class of resource. If a process instantiates objects that use different classes of resources, each object may be associated with a different partition.

The partitioning module 300 may generate partition groups that allow a single, arbitrarily named, pseudo-partition to represent other real partitions. This capability may allow association of resource partitions of different types (or classes) using a single specified name. Furthermore, partitions of different resource classes may be associated with one another using the single specified name. This capability may alternatively be provided as a layer on top of the resource partitioning design.

Resource partition objects of a given resource class may nest. Newly created resource partition objects may subdivide a parent partition to form a partition hierarchy. Nesting may be used to constrain a newly created partition objects with the attributes of one or more related partition objects.

Memory resources may be available to support the media storage devices 155 and corresponding media files. The processes of the media applications 145 may generate media objects that are in concurrent communication, either directly or indirectly, with the media storage devices 155. Processing system 100 includes four media storage devices and, as such, may support at least four concurrent media store objects. Four database partition objects with minimums and maximums parameters for allocation of one or more of the resources may be generated so that the processing system 100 may handle media store objects for all four sources. For example, system 100 may create a memory stores object associated with media files on a non-volatile memory card engaged with USB device 170. The memory partition may include a maximum of 25% to store photograph-related data, 25% for movies, and 50% for audio files. The same or different proportions may be used for other partitions created for each media storage device 155.

The database for the media store objects may organize in a table architecture. When media is inserted into a media storage device 155, the maximum number of database table entries may be determined by the formula:

$$\text{max entries} = \min(\text{device max, number available} - \text{sum(all other devices' unused reserves)})$$

Using this determination, the maximum number of database table entries may be the lesser of the device's maximum number of entries or the number of entries currently available less the sum of the unused reserve entries of all other devices. The maximum number of media store objects 180 that may be available to a resource allocation of a partition object may be the minimum of N for that partition and the total objects available on the system less the sum of the unused reserves of all other partitions, where an unused reserve is M minus the number of allocated objects for the partition (this may be limited to "0" in cases where the partition has allocated more than M objects). This determination may assume that the implementation allocates the objects for each partition out of a common pool, which may allow flexible and dynamic allocation of objects.

Resource Partition Attributes and Policies

A resource partition class may be an entity that represents the attributes and parametric rules which govern the use of a resource. Resource partition classes may have the following configurable attributes that may define a given level of accessibility to the resource by competing processes:

i. minimum size (guarantee); the minimum size attribute may specify the amount of a particular class of resource that may be reserved for exclusive use by processes which are associated with the partition; and ii. maximum size (restriction); the maximum size attribute may specify the amount of a particular class of resource that may never be exceeded for use by processes which are associated with the partition.

Some results of these attributes may include:

i. Reserved Resource

A non-zero minimum value may be used to represent a reservation and not an allocation. When a non-zero minimum value is configured for a resource partition object, the media store resource may be reserved for exclusive use by that resource partition object in the resource allocator for that resource class (e.g., memory storage for the media store objects). It need not be pre-allocated. and Allocations made against resource partition objects with reservations may be accounted against unused reservations first and against available discretionary resource capacity second;

ii. Discretionary Resource

The difference between the maximum and minimum values for a resource partition object may represent the amount of discretionary resource of that resource class (e.g., memory) available for the creation of media store objects associated with the resource partition class. The value may be zero; and Access to discretionary resource capacity (e.g., discretionary, non-allocated memory) may be dependent upon system partition configuration and may not guarantee availability of the resource.

Discretionary capacity may be allocated as it is requested by a process, but other allocating rules may also be used.

Resource Partition Types

A variety of attributes and parametric rules may define a resource partition class. Partitioning configurations may include:

1. "Open" use case; minimum=0, maximum=no limit; discretionary only;

Resource allocations made for media store objects associated with this partition type may be subject to the availability of discretionary capacity of the resource. There may be no limit (beyond the limit of physical resources available to the resource allocator 210 for the object) to the amount of the resource that may be requested by a process. Allocations made for media store objects of processes associated with this resource partition class may not succeed. This partition configuration may create an environment similar to the case when there is no resource partitioning. If resource capacity is available, the allocation request may succeed (notwithstanding factors unrelated to availability), otherwise it may fail.

2. "Guarantee" use case; minimum=N, maximum=no limit, reserved+discretionary;

"N" capacity of the respective resource class may be reserved and available for allocation to media store objects generated by processes associated with the resource partition. There may be no limit (beyond the limit of physical resources available to the resource allocator 210 of that class) to the amount of the resource (e.g., memory) that may be requested. This partition configuration may be used when objects associated with this resource partition will require a specific amount of the resource. Further resource requirements may be governed by the parametric rules for discretionary resource allocations.

3. "Restricted" use case; minimum=0, maximum=N, discretionary only;

Resource allocations made for media store objects generated by a process associated with this resource partition type are subject to the availability of discretionary capacity and, furthermore, may not exceed the limit of "N" capacity. This partition configuration may be used when it is not known what the resource requirements are for the objects of the processes associated with this resource partition. The "N" capacity limit may not be exceeded.

4. "Sandbox" use case; minimum=N, maximum=N, reserved only;

"N" capacity, and only "N" capacity of the respective resource class may be reserved and available for allocation to media store objects generated by processes associated with the resource partition object. This partition configuration may be used when the resource requirements for the media store objects of processes associated with this partition are known and/or for situations where a course subdivision of the available resource class is desired. This configuration may allocate resources for further subdivision (using any of the defined partition configurations) by other processes.

5. "Guaranteed-Restricted" use case; minimum=M, maximum=N, reserved+limited discretionary;

Resource allocations made for media store objects generated by processes associated with this resource partition type are subject to the availability of discretionary capacity and furthermore may not exceed the limit of "N" capacity. Further, a capacity of "M" of the resource class may be reserved. M may be less than N. When M equals N, this becomes the "Sandbox" case. This partition configuration may be used to guarantee the ability of the system to satisfy resource requests for media store objects generated by processes associated with this partition while at the same limiting its ability to consume all available discretionary resources.

Partitions are not limited to a fixed number of types. Another configuration might combine the guarantee and restricted types. This configuration may specify a reserved capacity but allow for a "not to exceed" buffer of discretionary allocations. This configuration may be used to assist in tuning a sandbox or for accommodating transient resource allocations in a guarantee partition.

Partitions may be established at run time and/or at the time a bootable image is built using run-time APIs and build-time tools. Partitions may be dynamic. An "open" partition may be dynamically changed to a "closed" one (or changed to any other partition type) when the minimum and/or maximum values are changed at run time.

Resource Partition Configurations

Using the various partition types, resource partitions may be organized into various topologies or configurations that allow them to be useful. The resource partitioning module may create a root partition that does not have a parent partition. Resource partition topologies may either be flat, in which all resource partitions are root partitions, or hierarchical, in which at least one root partition exists with one or more child partitions beneath it. In a flat topology, the attributes specified for a resource partition are not based on the attributes of any other resource partition. Resource partitions of any type may be created so long as the parametric rules for creation are satisfied.

In a hierarchical topology, the attributes of a parent resource partition may constrain the attributes of the child. The following parametric rules may be used in a resource partition hierarchy:

The rule of subdivision is that when a partition is created as the child of an existing partition, a non-zero minimum configured in the child may be accounted as an allocation to the parent partition. If the parent partition has any unallocated reserved capacity, it may be used to satisfy some or all of the child reservation. This reservation may be accounted up the entire resource partition hierarchy until it is fully accounted for in either a parent partition or some combination of parent partitions and the allocator for the resource class.

When an allocation is made for a resource in a child partition, the allocation may be accounted for in the partition hierarchy. Enough "free space" should exist in the hierarchy in order for an allocation to succeed.

Partition rules govern whether the allocation of capacity will be allowed to proceed. There are many other reasons unrelated to availability that might prevent the resource allocator 210 for a given class of resource from satisfying an allocation request. For example, if the resource is memory, a request for a contiguous block of physical memory may not exceed the size rules of the partition, but due to internal fragmentation, may not be able to be satisfied by the allocator for the memory class.

The parametric rules governing the use of the attributes may be as follows:

The maximum size attribute is always >=the minimum size attribute;

The minimum/maximum size attributes have a range from 0 to unlimited; and

Minimum and maximum values can be modified subject to the aforementioned parametric rules.

Pseudo Partitions or Partition Groups

A real partition may be a partition of a resource class. Pseudo partitions and partition group names may be used to group real partitions for convenience. A real partition may be a partition with attributes and policies that refer to an actual resource. A group name may be a reference to a collection of real partitions. A pseudo partition may be an alias for a real partition. Group names and pseudo partitions may be used to simplify process associations by allowing association between a process and a single group name and, by extension, to a collection of real partitions through their respective pseudo partitions. Group names and pseudo partitions may also be used to link differing resource types through a common partition name.

Process Association with Resource Partitions

When a process is created, optional parameters to posix_spawn( ), or whatever process spawning primitive the operating system provides, allow the specification of resource partition(s) with which the spawned process should be associated. If nothing is specified, the default behaviour may include associating the spawned process with the same partition(s) as those of the caller. A forked process may be associated with the same partition(s) as the parent. The decision for inheritance behaviour may be specified on a per resource class basis.

By utilizing APIs, processes may be able to associate themselves with partitions, (e.g., self-initiated). Similarly, a system controller application may utilize the same API's to effect associations for other processes without coordinating with those processes or without the processes being aware that such associations have been effected on their behalf. In some systems, restrictions may be imposed that prevent incorrect configurations that use pseudo and real partition with the same process. These restrictions may prevent an association with the same process.

Resource Partition Metrics

The resource partition metrics account for the available system resources and their usage. Applications may retrieve the following information:
- creation configuration (attributes and policies at the time the partition was created);
- current partition usage; and
- highest partition size.

Resource Partition Events

When an application attempts to allocate more resource capacity than is permitted by the resource partition that the process is associated with, the allocation request may fail and return the appropriate error condition to the requester. A privileged process may register to be notified for various partition events. Notification may be delivered by a message or signal to a designated thread of the registered process or by any other form or inter-process communication or thread synchronization primitive provided by the operating system. These events may include, for example:
- size change events (threshold crossing and delta change);
- configuration change events (including, for example, failed attempts);
- process association and disassociation events (including, for example, failed attempts); and
- child partition creation and destruction events (including, for example, failed attempts).

Similar information may be available for the resource class as a whole.

Figure 3:
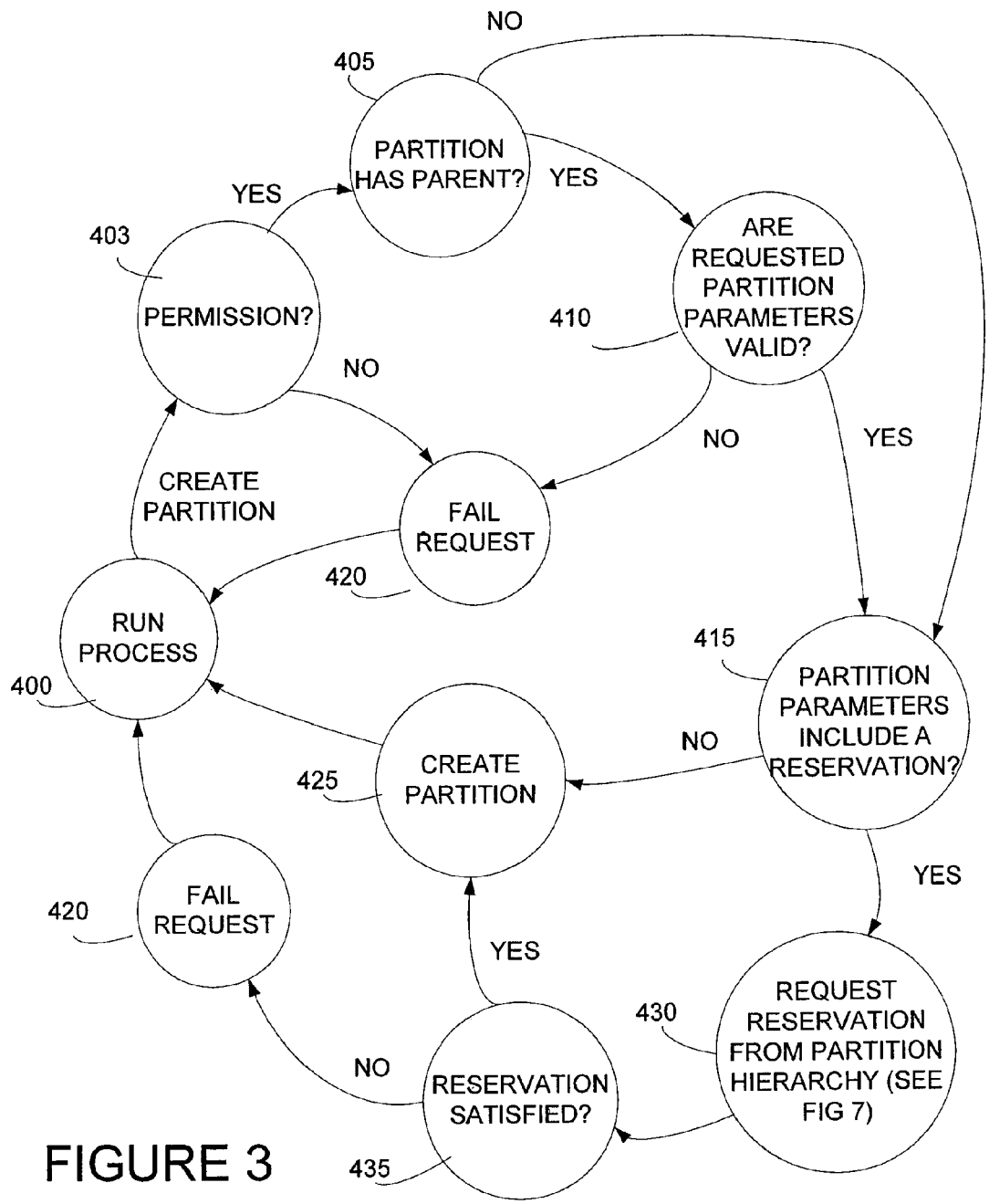
FIG. 3 is a process for implementing resource partitioning.

An implementation of the partitioning module 300 is presented in the diagrams of FIGS. 3 through 10. As shown in FIG. 3, when a running process 400 issues a command to establish a partition, the partitioning module 300 determines whether the process has the authorization or permission to create the partition (403). If authorization is not received, then the request fails at 420, and control may return to the running process at 400. If the process has permission to create a partition, then the partitioning module 300 determines at 405 whether the requested resource partition will have a parent. If the resource partition does not have a parent, then the resource partition is a root partition, and control may pass to 415. If the partition will have a parent, then the process determines whether the requested partition parameters are valid at 410 by inspecting the partition hierarchy in which the new partition is being created. If the configuration parameters are not valid, then the partition request fails at 420. A notification may be issued on failure, or control may be to the requesting process either for another attempt or to abandon the attempt.

If the requested partition parameters are valid, then it may be determined at 415 whether the partition parameters include a resource reservation. If not, then a resource partition may be created at 425. If the partition parameters include a reservation, then a reservation may be requested from the partition hierarchy, if one exists. The request propagates up the hierarchy until it is satisfied by one or more parent partitions and/or from the resource allocator at 430 for the resource class. If the new partition is a root partition, the request may be sent to the resource allocator 210 for the resource class. In either case, if the reservation is satisfied at 435, then the resource partition may be created at 425 and control may return to the requesting process. If the reservation is not satisfied, then the request fails at 420.

Figure 4:
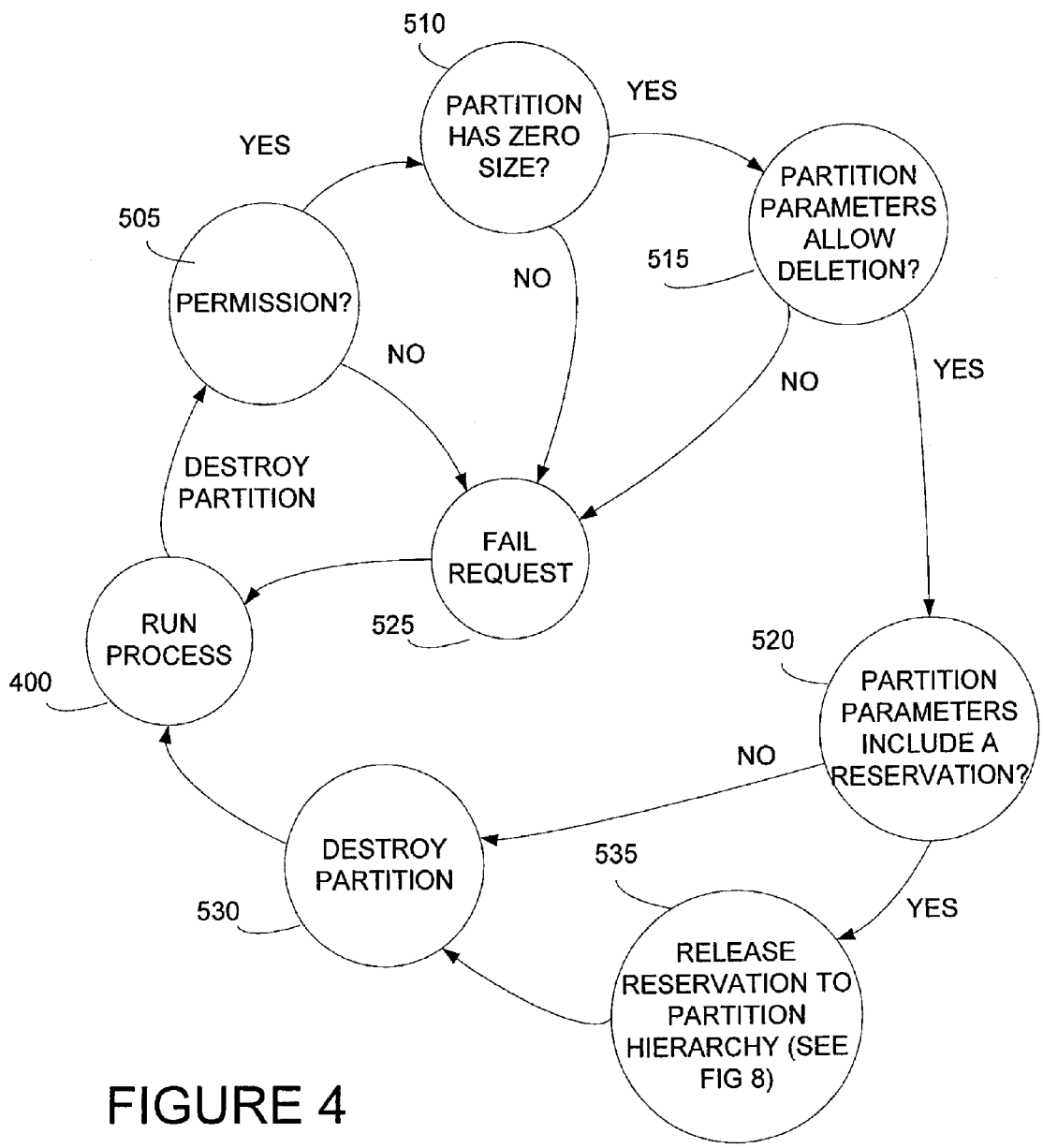
FIG. 4 is a process that may destroy a resource partition.

FIG. 4 is a process for destroying a partition. When the running process 400 issues one or more commands to destroy a partition, the partitioning module 300 determines whether the process has the authorization or permission to destroy the partition at 505. If not, then a fail request may be issued at 525, and control may return to the running process 400. If the process has permission to destroy a partition, then it determines at 510 whether the identified resource partition has a zero size. If it does not, then the request fails at 525. If it does have a zero size, then control passes to 515, where the process determines whether the partition parameters allow deletion. A partition will not have a zero size if there are any processes or resource objects still associated with it. Processes should disassociate and the media store objects released before a partition may be destroyed.

Figure 8:
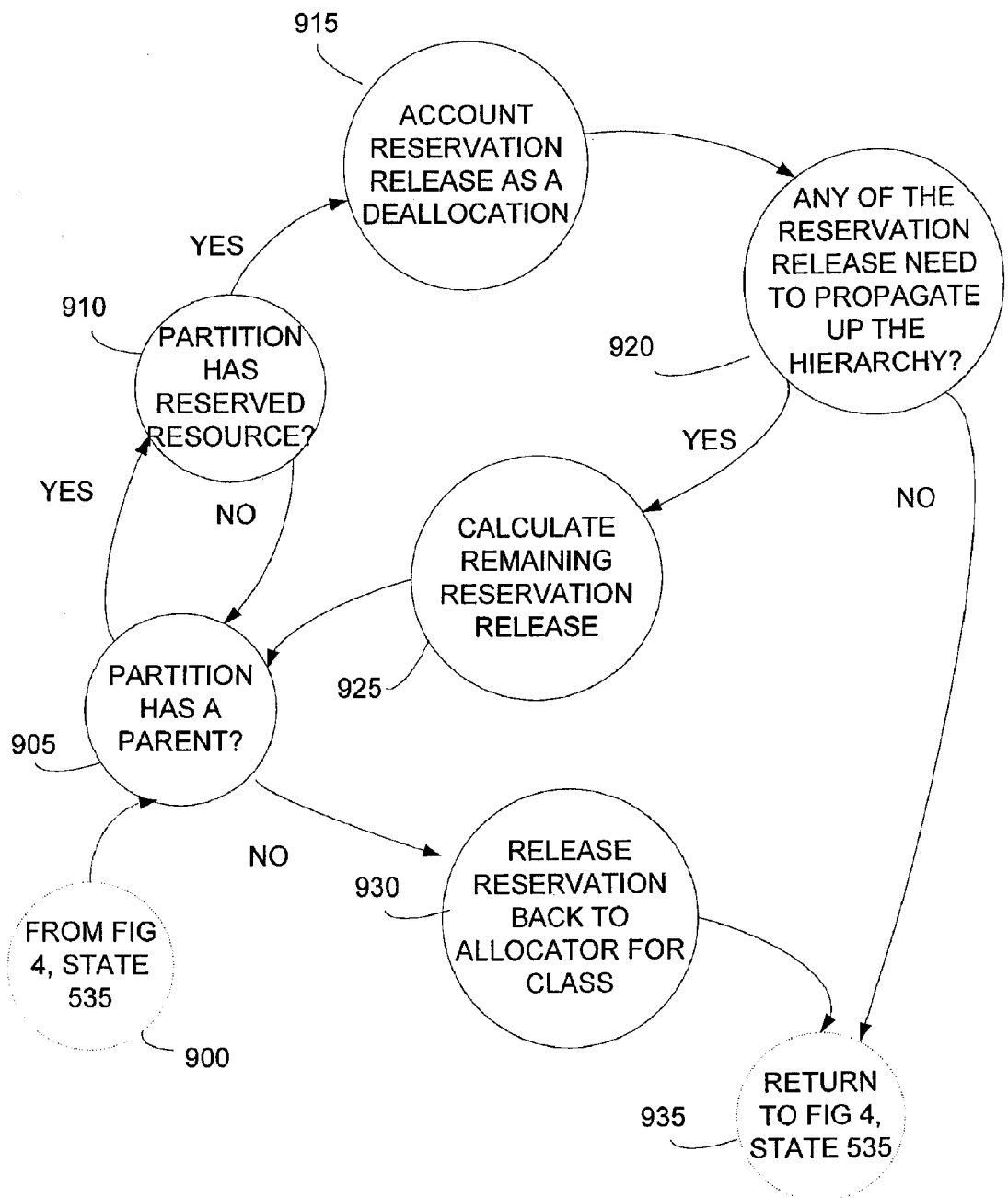
FIG. 8 is a process that may release a resource reservation to a resource partition hierarchy.

If the parameters do not allow deletion, then the request fails at 525. If the parameters allow deletion, then the process determines whether the partition parameters include a reservation at 520. If they do not, then the partition may be destroyed at 530, and control may return to the running process at 400. If the partition parameters include a reservation, then the reservation may be released to the partition hierarchy at 535 before the partition is destroyed at 530. FIG. 8 is a process for releasing a reservation to the partition hierarchy of 535.

Figure 5:
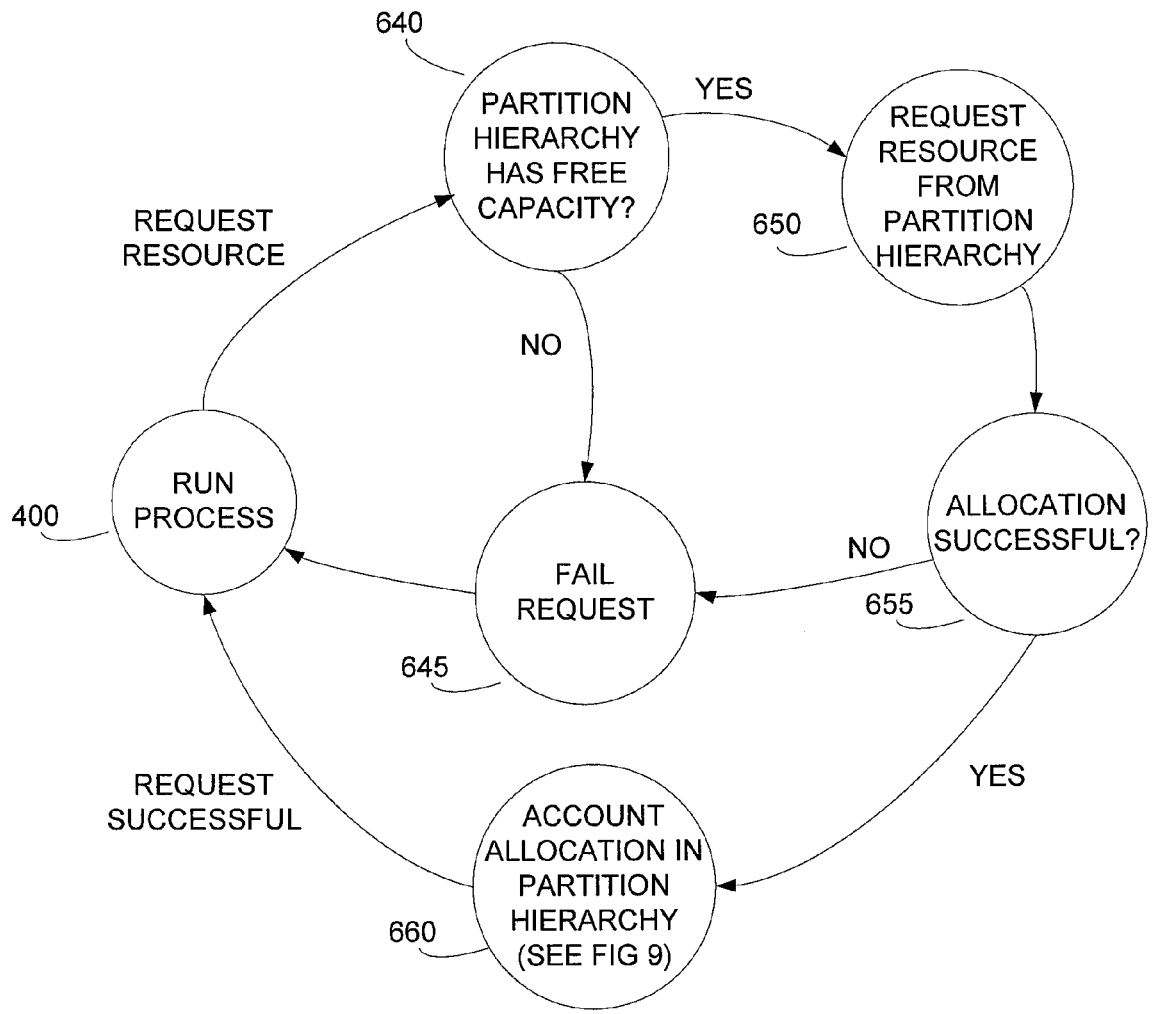
FIG. 5 is a process that may request a resource governed by resource partition characteristics.

FIG. 5 is a process for allocating a partition resource at runtime. When the software process 400 requests resource, the partitioning module determines whether the partition hierarchy has free space at 640. If the resource is not available, then the request fails and process control may pass to 645. This failure may be reported to one or more processes pursuant to an attempt to reexecute the request. If the resource is available, then the resource may be requested from the resource allocator at 650. The request to the resource allocator 210 may include a number of different parameters such as the amount of the allocation request that may be accounted to a previously established reservation, which portion should be accounted to an unreserved resource, and other media resource parameters of the type noted above. If resource allocation is successful at 655, then the resource may be accounted for at 660 and control may return to the requesting process to continue processing. If the allocation is not successful, then the request fails 645, then a failure notification may be issued before returning control to the requesting process. In the event of a failure, there is no impact on the resource allocation, so there is no need to perform any accounting exercise.

Figure 6:
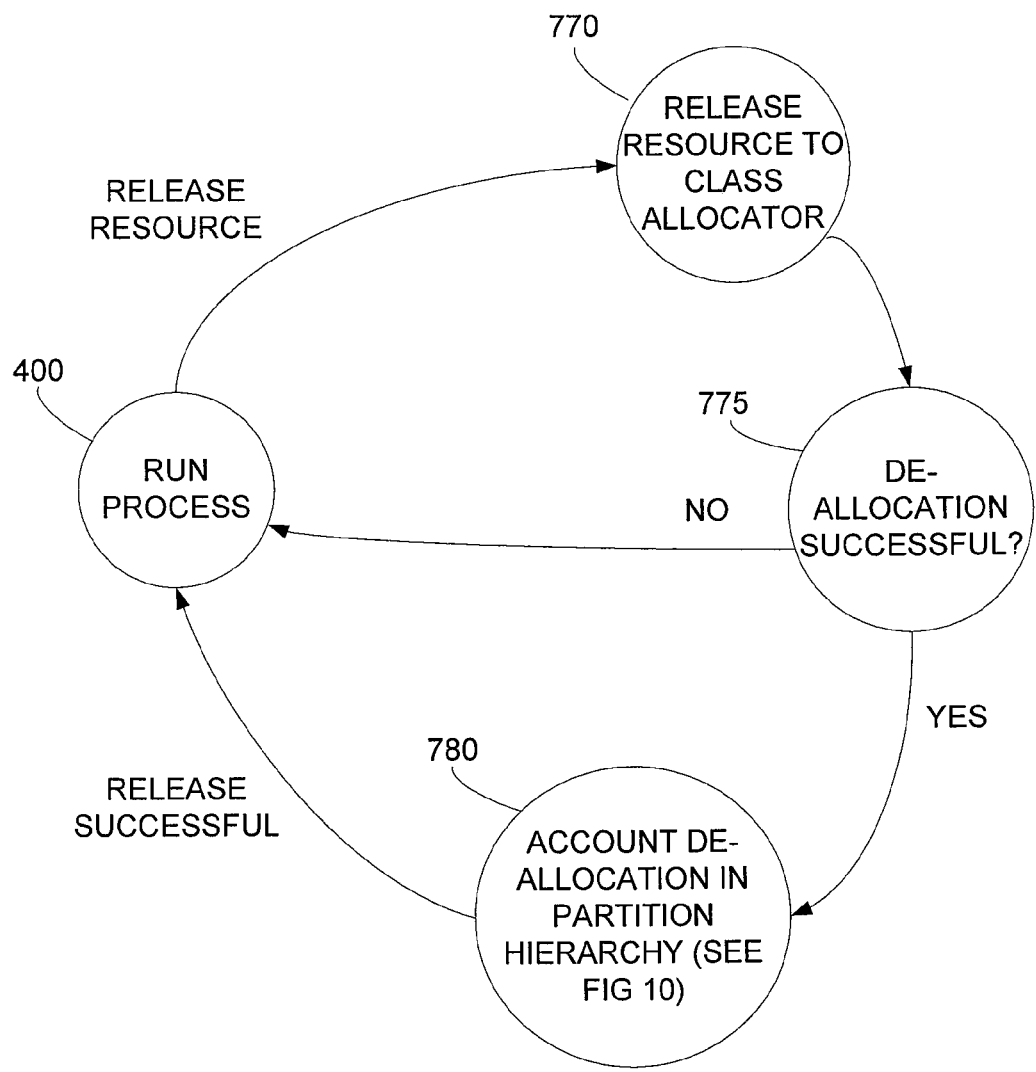
FIG. 6 is a process that may release a resource governed by resource partition characteristics.

The elected or automatic release of a resource may follow the process shown in FIG. 6. When a resource is no longer required, the process 400 issues a resource release command at 770. If it is determined at 775 that the resource release was successful, then the resource release may be accounted for at 780 so that the released resource may become available for other processes. If the resource release instruction has insufficient permissions, or otherwise has bad parameters, the release is unsuccessful at 775 and the resource remains accounted for as in use.

Figure 7:
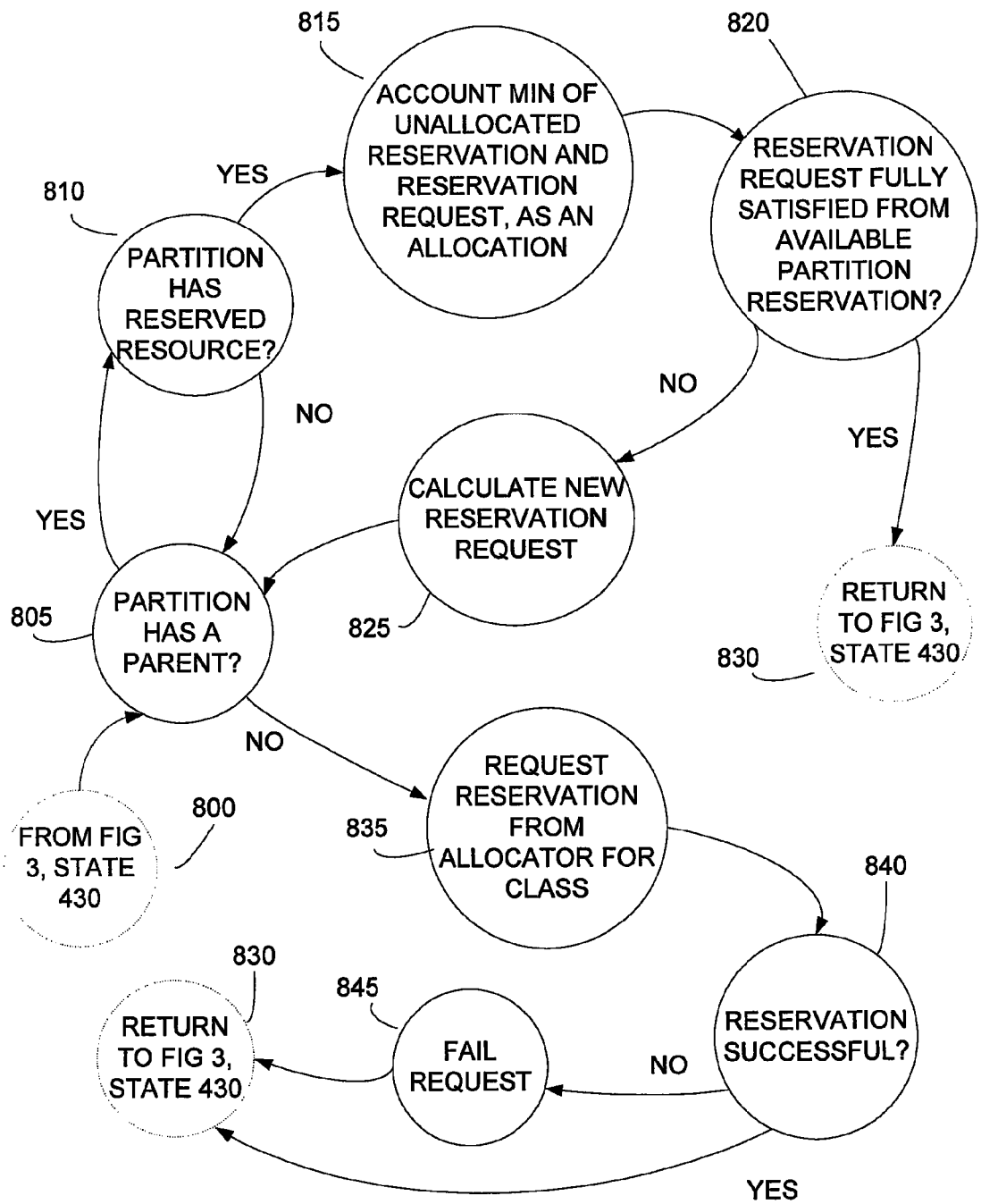
FIG. 7 is a process that may request a resource reservation from a resource partition hierarchy.

FIG. 7 is a process for requesting a reservation from a resource partition hierarchy. The process begins with a query to establish whether the partition has a parent at 805. If it does, then a query may be made to determine whether the partition has a reserved resource 810. If the partition has a reserved resource, then the minimum of the (unallocated reservation and the reservation request) may be accounted for as an allocation at 815. The process then determines at 820, whether the reservation request fully satisfies the available partition reservation. If so, then control may return to 430 of FIG. 4 at 830. If not, then a new reservation request may be calculated at 825.

If it is determined at 805 that the partition does not have a parent, then the new reservation may be requested from the allocator for the class 835. If the reservation is successful at 840, then control may return to 430 of FIG. 4. If the reservation is determined to be unsuccessful at 840, then a fail request may be issued 845 and control returned to 430 of FIG. 4.

FIG. 8 is a process for deallocating a reservation from a resource partition hierarchy. The process may begin with a query to establish whether the partition being deallocated has a parent at 905. If it does, then a query may be made to determine whether the partition has a reserved resource 910. If the partition has a reserved resource, then the account reservation may be released as a deallocation at 915. The process may determine whether any portion of the reservation being released needs to propagate up the partition hierarchy at 920. This may occur when the original reservation (treated as an allocation in the hierarchy) may be satisfied from reservations of partitions higher up in the partition hierarchy. If satisfied, then the remaining reservation to be released may be calculated at 925 and control may return to 905 so that this release can be completed. Otherwise, control may return to 535 of FIG. 5 (935).

At 905, the process may determine that the partition does not have a parent. As a result, the reservation may be released back to the allocator for the class, at 930. Control may return to 535 of FIG. 4 (935).

Figure 9:
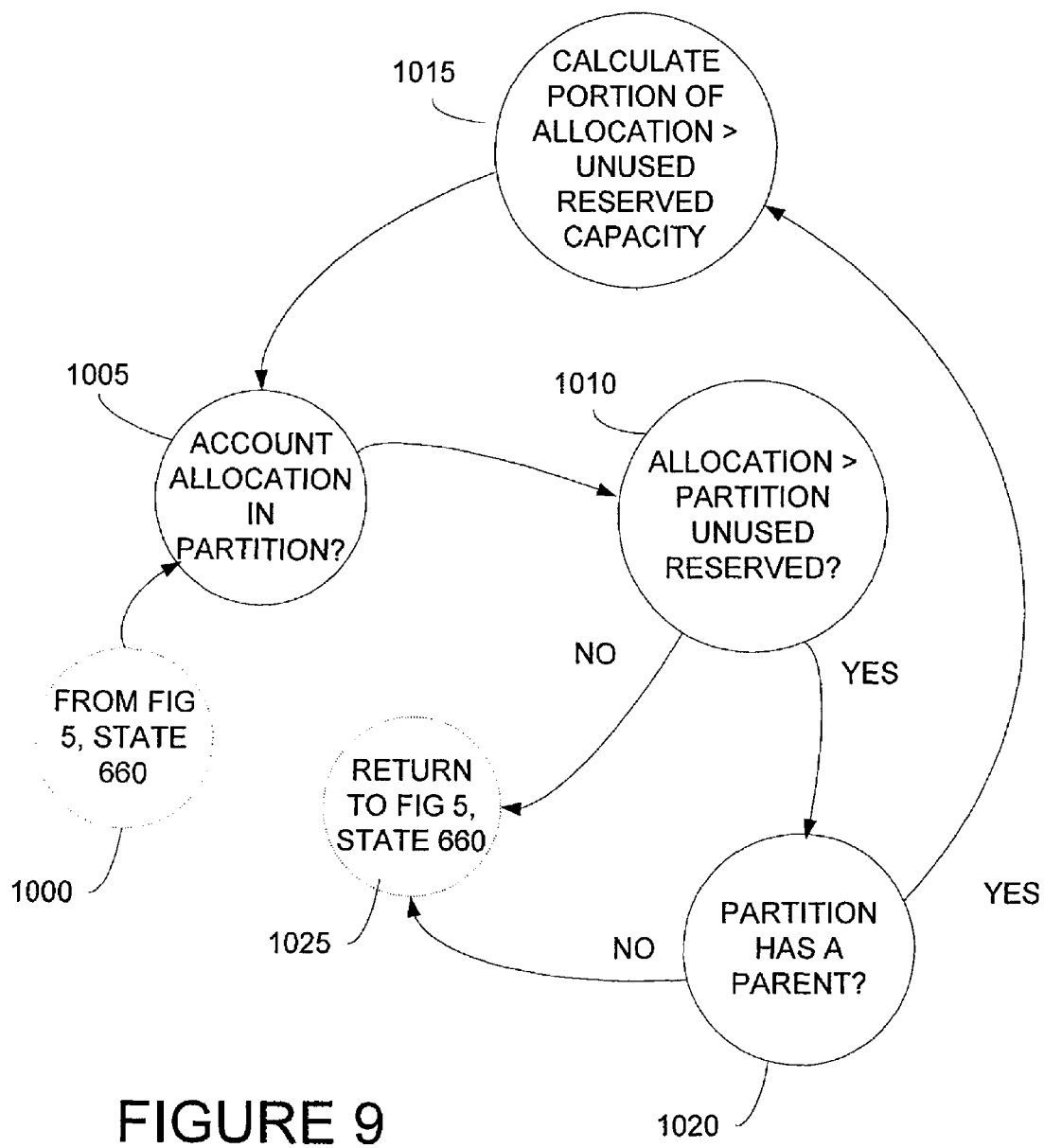
FIG. 9 is a process for accounting an allocation of a resource to a process in a resource partition hierarchy.

FIG. 9 is a process for accounting for allocation in a partition hierarchy may occur. The process may begin by determining the amount of the resource to allocate in the partition at 1005. The process may determine whether the allocation is greater than the unused reserved space for the partition at 1010. If not greater than the unused reserved space, then control may be returned to 660 of FIG. 5 (1025).

If the allocation is greater than the unused reserved space for the partition, then the process may determine whether the partition has a parent at 1020. If the partition does not have a parent, then control may return to 660 of FIG. 5 (1025). If the partition has a parent, then the portion of the allocation that is greater than the unused reservation may be calculated at 1015, and control may return to 1005 so that the allocation can be accounted for. The process may continue looping up through the hierarchy at 1020 to account for the allocation on all levels.

Figure 10:
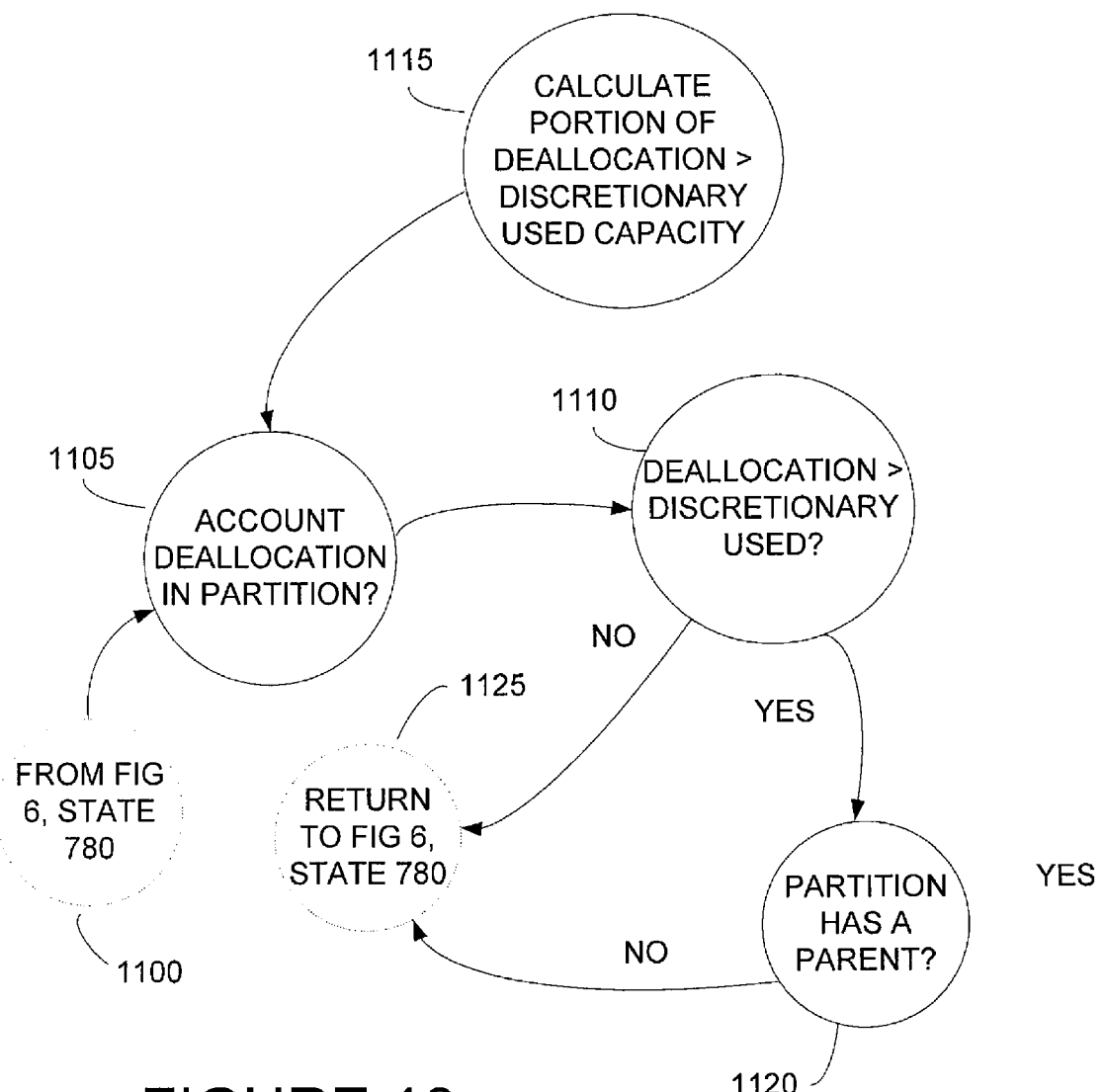
FIG. 10 is a process that may be used for accounting a deallocation of a resource in a resource partition hierarchy.

FIG. 10 is a process for resource deallocation. The process may begin by determining the amount of the resource to deallocate in the partition at 1105. The process may determine at 1110 whether the deallocation is greater than the discretionary amount of the resource used for the partition. If not, then control may return to 780 of FIG. 6 (1125).

If the deallocation is greater than the discretionary unused resource for the partition then it may be determined whether the partition has a parent at 1120. If the partition does not have a parent, then control may return to 780 of FIG. 6 (1125). If the partition has a parent, then the process may calculate the portion of the deallocation that is greater than the discretionary unused reservation at 1015. Control may return to 1105 so that the deallocation may be accounted for. The process may loop up through the hierarchy at 1120 to account for the allocation on all levels of the hierarchy.

System 100 may be implemented in a vehicle telematics system that may communicate with a transmitter/transceiver (e.g., a Bluetooth device or the like) at a particular location, such as a gas station. While at the location, media content may be downloaded to the system 100. The media content may include movies, local advertisements, maps, lists of local restaurants, motels, and other information. The information for the multimedia content and the GPS waypoint content may or may not share the same database. If the GPS waypoints and routes are stored in the same database as the multimedia system's media store objects, then the highest level partition may be split between these functions. The GPS partition may be further partitioned into minimums and maximums for waypoints and routes. The multimedia partition may be subpartitioned into the minimums and maximums for the possible multimedia devices that can be in the system at one time. The movie itself may be stored on a hard drive outside the metadata partition.

The methods and descriptions of the system provided herein may be encoded in a signal bearing medium, a computer readable medium or a computer readable storage medium such as a memory that may comprise unitary or separate logic, programmed within a device such as one or more integrated circuits, or processed by a controller or a computer. If the methods are performed by software, the software or logic may reside in a memory resident to or interfaced to one or more processors or controllers, a wireless communication interface, a wireless system, a powertrain controller, an entertainment and/or comfort controller of a vehicle or non-volatile or volatile memory remote from or resident to a the device 300. The memory may retain an ordered listing of executable instructions for implementing logical functions. A logical function may be implemented through digital circuitry, through source code, through analog circuitry, or through an analog source such as through an analog electrical, or audio signals. The software may be embodied in any computer-readable medium or signal-bearing medium, for use by, or in connection with an instruction executable system or apparatus resident to a vehicle or a hands-free or wireless communication system. Alternatively, the software may be embodied in media players (including portable media players) and/or recorders. Such a system may include a computer-based system, a processor-containing system that includes an input and output interface that may communicate with an automotive or wireless communication bus through any hardwired or wireless automotive communication protocol, combinations, or other hardwired or wireless communication protocols to a local or remote destination, server, or cluster.

A computer-readable medium, machine-readable medium, propagated-signal medium, and/or signal-bearing medium may comprise any medium that contains, stores, communicates, propagates, or transports software for use by or in connection with an instruction executable system, apparatus, or device. The machine-readable medium may selectively be, but not limited to, an electronic, magnetic, optical, electromagnetic, infrared, or semiconductor system, apparatus, device, or propagation medium. A non-exhaustive list of examples of a machine-readable medium would include: an electrical or tangible connection having one or more links, a portable magnetic or optical disk, a volatile memory such as a Random Access Memory "RAM" (electronic), a Read-Only Memory "ROM," an Erasable Programmable Read-Only Memory (EPROM or Flash memory), or an optical fiber. A machine-readable medium may also include a tangible medium upon which software is printed, as the software may be electronically stored as an image or in another format (e.g., through an optical scan), then compiled by a controller, and/or interpreted or otherwise processed. The processed medium may then be stored in a local or remote computer and/or a machine memory.

While various embodiments of the invention have been described, it will be apparent to those of ordinary skill in the art that many more embodiments and implementations are possible within the scope of the invention. Accordingly, the invention is not to be restricted except in light of the attached claims and their equivalents.

We claim:

1. A processing system comprising:
   a processor;
   memory;
   one or more media storage devices accessible to the processor, where the one or more media storage devices access media files;
   process code executable by the processor to spawn a process, where execution of the process includes a request for access to the memory;
   resource partitioning code executable by the processor to generate at least resource partition object and to assign at least one process to the resource partition object, where the process generates one or more media store objects for storage in the memory, where the media store objects correspond to the one or more media storage devices, and where access by a process to the memory for storage of its media store objects is based on parametric rules of the corresponding resource partition object.

2. The system of claim 1, where the one or more media storage devices comprise multiple media storage devices, where the one or more media store objects comprise multiple media store objects, and where each of the multiple media store objects is respectively associated with one of the multiple media storage devices.

3. The system of claim 1, where the one or more media store objects comprise multiple media store objects, and where the multiple media store objects are organized in the memory in a database table.

4. The system of claim 1, where the process code is executable to spawn multiple processes, where execution of the processes includes competing resource requests for access to the memory.

5. The system of claim 4, where the parametric rules of a given resource partition object associated with one or more of the processes comprises configurable parameters that define a level of accessibility to the memory by the one or more processes associated with the given resource partition object, where the level of accessibility is used to grant access to the memory with respect to other processes that are not associated with the given resource partition object.

6. The system of claim 5, where the parametric rules of the given resource partition object comprise:
   a minimum size parameter specifying an amount of the memory that may be reserved for exclusive use by one or more of the multiple processes associated with the given resource partition object; and
   a maximum size parameter specifying a maximum amount of the memory that may be allocated for use by the one or more processes associated with the given resource partition object.

7. The system of claim 1, where the media store objects comprise metadata for media files accessed by the one or more media storage devices.

8. The system of claim 1, where the one or more media storage devices comprise media files of different types.

9. The system of claim 8, where a given resource partition object associated with a given media storage device comprises parameters for allocating an amount of the memory to media store objects of the given media storage device, where the given resource partition object divides the allocated memory into proportions based on the type of media file represented by the media store objects.

10. A system comprising:
    memory;
    process code that is executable by a processor to spawn multiple processes, where execution of the multiple processes includes requests for access the memory;
    resource partitioning code executable by the processor to generate resource partition objects and to assign at least one process to a resource partition object, where the processes generate one or more media store objects for storage in the memory, where the media store objects correspond to one or more media storage devices that are used to access media files, and where access by a process to the memory for storage of its media store objects is based on parametric rules of the corresponding resource partition object.

11. The system of claim 10, where the media store objects are organized in the memory in a database table.

12. The system of claim 10, where the parametric rules of a given resource partition object associated with one or more of the processes comprises configurable parameters that define a level of accessibility to the memory by the one or more processes associated with the given resource partition object, where the level of accessibility is used to grant access to the memory with respect to other processes that are not associated with the given resource partition object.

13. The system of claim 12, where the parametric rules of the given resource partition object comprise:
    a minimum size parameter specifying an amount of the memory that may be reserved for exclusive use by one or more of the processes associated with the given resource partition object; and
    a maximum size parameter specifying a maximum amount of the memory that may be allocated for use by the one or more processes associated with the given resource partition object.

14. The system of claim 10, where the media store objects comprise metadata for the media files.

15. The system of claim 10, where the one or more media storage devices comprise media files of different types.

16. The system of claim 13, where a given resource partition object associated with a given media storage device comprises parameters for allocating an amount of the memory to media store objects for the given media storage device, where the given resource partition object divides the allocated memory into proportions based on the type of media file represented by the media store objects.

17. A process for managing memory in a media system comprising:

spawning multiple processes;

executing the multiple processes to provide requests for access a memory;

generating resource partition objects;

assigning at least one process to a resource partition object;

generating, using at least one of the multiple processes, one or more media store objects for storage in the memory, where the media store objects correspond to one or more media storage devices that are used to access media files; and controlling access by a process to the memory for storage of its media store objects based on parametric rules of the corresponding resource partition object.

18. The method of claim 17, further comprising organizing the media store objects in the memory in a database table.

19. The method of claim 17, further comprising assigning parametric rules to the resource partition object, where the parametric rules comprise: a minimum size parameter specifying an amount of the memory that may be reserved for exclusive use by one or more of the processes associated with the resource partition object; and a maximum size parameter specifying a maximum amount of the memory that may be allocated for use by the one or more processes associated with the resource partition object.

20. The method of claim 17, further comprising configuring the resource partition object associated with the one or more of the processes to define a level of accessibility to the memory by the one or more processes associated with the resource partition object, where the level of accessibility is used to grant access to the memory with respect to other processes that are not associated with the resource partition object.

* * * * *

UNITED STATES PATENT AND TRADEMARK OFFICE
CERTIFICATE OF CORRECTION

| | | |
|---|---|---|
| PATENT NO. | : 8,209,514 B2 | Page 1 of 1 |
| APPLICATION NO. | : 12/425905 | |
| DATED | : June 26, 2012 | |
| INVENTOR(S) | : Michael Kisel et al. | |

It is certified that error appears in the above-identified patent and that said Letters Patent is hereby corrected as shown below:

On the Title Page

Item (75), replace "Giles Roy" with --Gilles Roy--.

Signed and Sealed this
Ninth Day of October, 2012

David J. Kappos
*Director of the United States Patent and Trademark Office*